(12) United States Patent
Conrad

(10) Patent No.: US 7,459,636 B2
(45) Date of Patent: Dec. 2, 2008

(54) CABLE TIDY

(75) Inventor: Neville Simeon Conrad, London (GB)

(73) Assignee: First Major Assets Limited, London (GB)

( * ) Notice: Subject to any disclaimer, the term of this patent is extended or adjusted under 35 U.S.C. 154(b) by 0 days.

(21) Appl. No.: 10/535,514

(22) PCT Filed: Mar. 3, 2004

(86) PCT No.: PCT/GB2004/000883

§ 371 (c)(1),
(2), (4) Date: Dec. 19, 2005

(87) PCT Pub. No.: WO2004/114488

PCT Pub. Date: Dec. 29, 2004

(65) Prior Publication Data

US 2006/0102381 A1    May 18, 2006

(30) Foreign Application Priority Data

Jun. 16, 2003    (GB) ................... 0313897.1

Jan. 29, 2004    (GB) ................... 0401927.9

(51) Int. Cl.
*H02G 3/04* (2006.01)
(52) U.S. Cl. ................ 174/135; 174/72 A; 174/68.1; 312/223.1; 108/26; 206/37
(58) Field of Classification Search ............ 174/135, 174/21 R, 68.1, 68.3, 72 R, 72 A, 88 R; 312/223.1, 312/223.2, 223.6; 150/106, 114, 120–122; 108/26, 50.11, 25; 383/66; 206/37; 224/584
See application file for complete search history.

(56) References Cited

U.S. PATENT DOCUMENTS 3,588,019 A * 6/1971 Cozeck ................. 248/228.6
6,192,805 B1 * 2/2001 Saylor et al. ............... 108/26
6,701,677 B2 * 3/2004 Gresham et al. ........... 52/36.1

* cited by examiner

*Primary Examiner*—Dhiru R Patel
(74) *Attorney, Agent, or Firm*—Fay Sharpe LLP

(57) ABSTRACT

A cable tidy, including a rigid support member, carrying a cable retaining net which allows air to flow past the cable in order that heat dissipates quickly.

19 Claims, 5 Drawing Sheets

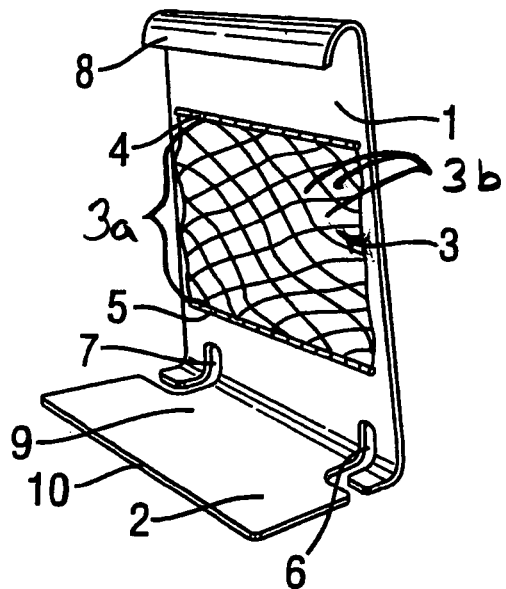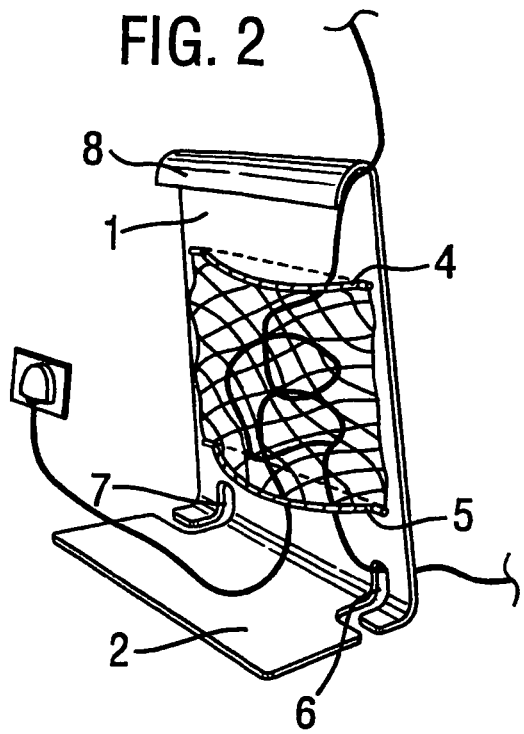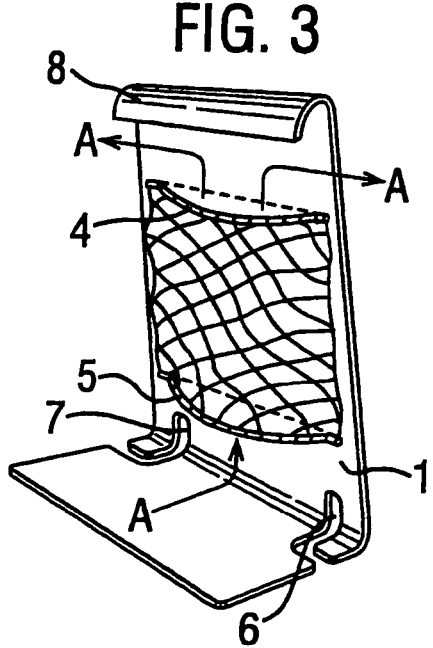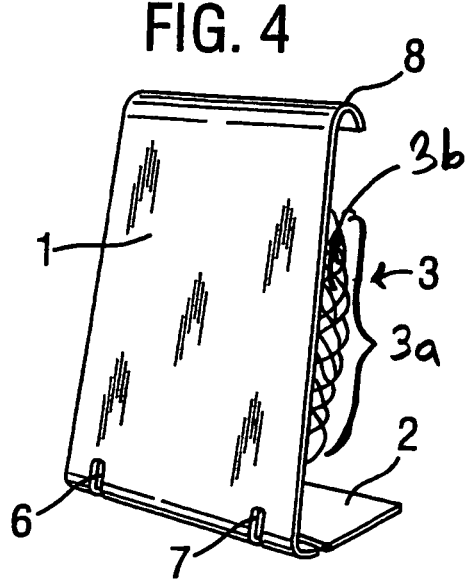

CABLE TIDY

The present invention relates to a housing or receptacle for loose electrical cable.

BACKGROUND OF THE INVENTION

In a typical office or home environment because of the large number of electrical and electronic appliances such as computers, TV Hi Fi, etc which are to be connected to the mains, usually via a multiway adapter, there typically results an unsightly and possibly dangerous tangle of cables, which is difficult to control. Accordingly, the prior art such as WO/0041276 provides an arrangement which facilitates the control of such cables, and is very simple to put into effect, without requiring any specialised electrical equipment. However in prior art solutions there can be a problem that due mainly to inductive effects in the cable, in the absence of sufficient air circulation, a build up of heat may occur within the enclosure rendering the enclosure unsafe due to the possibility of insulation melting leading to short circuits and possible fire risk.

BRIEF SUMMARY OF THE INVENTION

Accordingly the present invention provides a receptacle for electrical cable comprising a substantially rigid stand member carrying a flexible cable retaining member which is so formed as to resiliently retain the cable against the stand, while allowing a flow of air past the cable. The flexible member is preferably connected to the rigid member by relatively stiff but flexible straps which allow easy access to the interior of the receptacle and to further grip whilst helping to hold the cables securely in place. Preferably the cable retaining member has sufficient capacity to receive a multiway adapter as well as associated cables.

In a preferred embodiment the rigid stand member comprises a bent sheet which is preferably of plywood or moulded plastics, but metal or other rigid material may also be suitable. The flexible member preferably comprises an elasticated net. The net is preferably elastic enough to permit relatively bulky electrical plug appliances such as mobile phone chargers to be pushed through the apertures of the net and held securely inside it. However, any flexible material with a sufficient number of apertures to allow heat to quickly dissipate from the cable is suitable for the flexible member. The straps are preferably elasticated, being expandable enough to facilitate easy removal of the net to add or remove cables and firm enough to secure the flexible member in place, although any flexible or non-flexible connecting material is suitable. In a preferred embodiment there are two exit means from the device whereby cable exits to the power supply through one exit means and to an appliance or appliances through the other exit means. Preferably, the rigid member is adapted to hang from a table, desk, shelf or the like or adapted to stand vertically to save space. The rigid member may have guide slots for the cables so as to hold them in place and improve the appearance.

BRIEF DESCRIPTION OF THE SEVERAL VIEWS OF THE DRAWINGS

Some embodiments of the invention will now be described, by way of example, with reference to the accompanying drawings, in which:

FIG. 1 is a rear perspective view of a first embodiment of the invention in a first working orientation;

FIG. 2 is a rear perspective view of the embodiment of FIG. 1 in use;

FIG. 3 is a further rear perspective view of the embodiment of FIG. 1;

FIG. 4 is a front perspective view of the embodiment of FIG. 1;

DETAILED DESCRIPTION OF THE INVENTION

Figure 5:
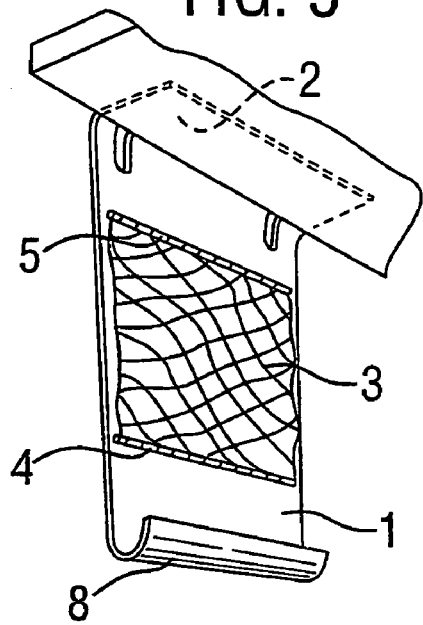
FIG. 5 is a rear perspective view of the embodiment of FIG. 1 in a second working orientation in conjunction with a table.

Referring to the drawings FIGS. 1-4 show a first embodiment of the invention in a standing orientation, which comprises a rigid stand member 1 formed from a rectangular sheet of plywood bent to form a base 2 so that it can stand upright. A resilient, flexible cable-retaining member 3 comprises an elastic net. As illustrated in FIGS. 1 and 4, the cable-retaining member or net 3 generally includes a wall 3a. The wall 3a is perforated so as to include a plurality of apertures 3b. As shown in FIGS. 1-4, the apertures 3b may comprise more than half of a surface area of the wall 3a. The cable-retaining member or elastic net 3 is attached to the rigid member 1 by a pair of elastic straps 4 and 5. The ends of the straps 4 and 5 are connected by screws or the like to the rigid member thus forming openings allowing the cables to be introduced between the net and the rigid member 1 as shown in FIG. 2, and indicated by arrows 'A' in FIG. 3. The rigid member 1 also includes cable guides which comprise slots 6 and 7 and a trough 8 which help to position and retain the cable. The base of the rigid member also has resilient strips of silicone or rubber 9 and 10 on its inner surface for use in an alternative working position, as explained below.

As an alternative, straps 4 and 5 need not be resilient but can be made from cord. As a further alternative, the flexible member need not be resilient but can be a string net or other net of non-resilient material.

Figure 6:
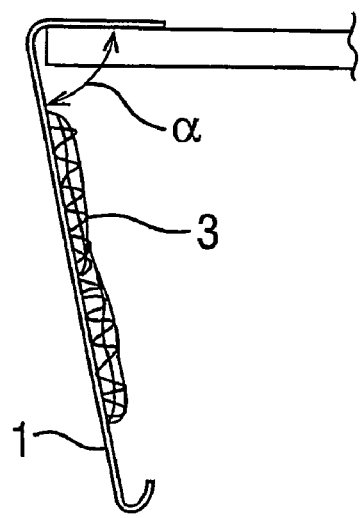
FIG. 6 is a side view of the arrangement of FIG. 5.
Figure 7:
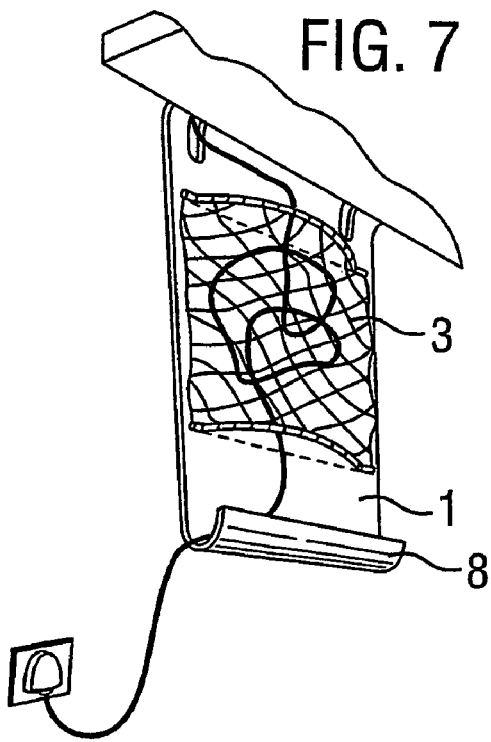
FIG. 7 is a similar view to that of FIG. 5, but also shows the arrangement of cable in the device.

FIGS. 5, 6 and 7 show the device of FIG. 1 in the alternative working position, in which it is suspended on the edge of a table and is particularly useful as it takes up no space on the floor which in an office is often already crowded. As shown in FIG. 6 the suspension is facilitated by the included angle α being such that the centre of gravity of the device is inboard relative to the edge of the table. In addition, the resilient strips 9 and 10 on the base 2 increase the friction between the surface of the table and the base. As shown in FIG. 7 the trough 8 is particularly useful in this second working position as, when some of the cable is resting within it, it reduces the force pulling the cable out of the flexible member 3.

The device can also be used in a third working position wherein the rigid member is positioned with the base 2 and the trough 8 resting on the floor such that the flexible member 3 hangs below the rigid member 1 and the rigid member 1 can be used as a footstool. This can provide a footrest under a desk whilst hiding the cable.

FIGS. 1 to 7 show the preferred form of cable management slots or guides 6 and 7 which extend inwards from the outer edges of the base 2 of the rigid member and then extend upwardly towards the flexible member 3. The benefit of this method of cable retention is that when the rigid member is being used in the "standing" position, once the cables are threaded through the guide they are located by three sides of the guide and retained in position by the supporting surface. In the second working position the guides 6 and 7 retain the cable between the sides of the guide and the adjacent surface of the table, shelf or desk.

Figure 8:
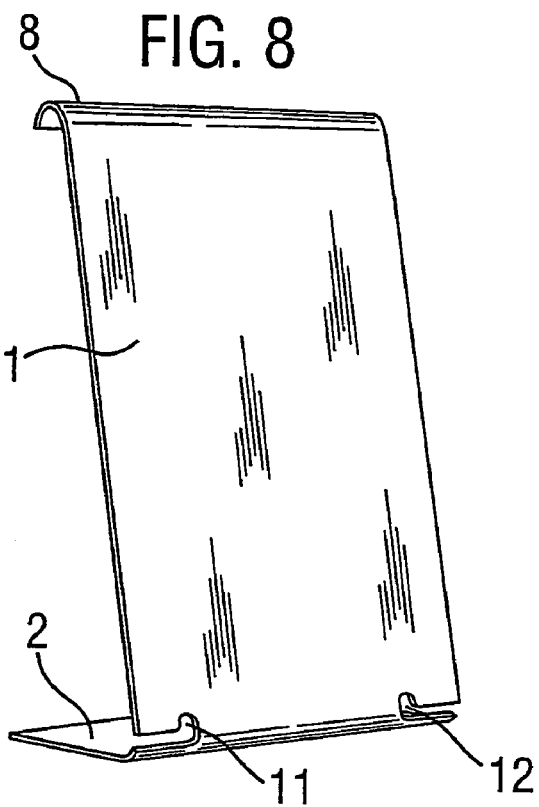
FIG. 8 is a front perspective view of a second embodiment of the invention.

FIG. 8 shows a second embodiment of the invention having alternative guides 11 and 12 to retain the cable which comprise slots extending inwards from the outer edges of the rigid member. These slots are particularly useful when the device is in the upright position as the cables can be introduced easily without having to slide them in a vertical direction.

Figure 9:
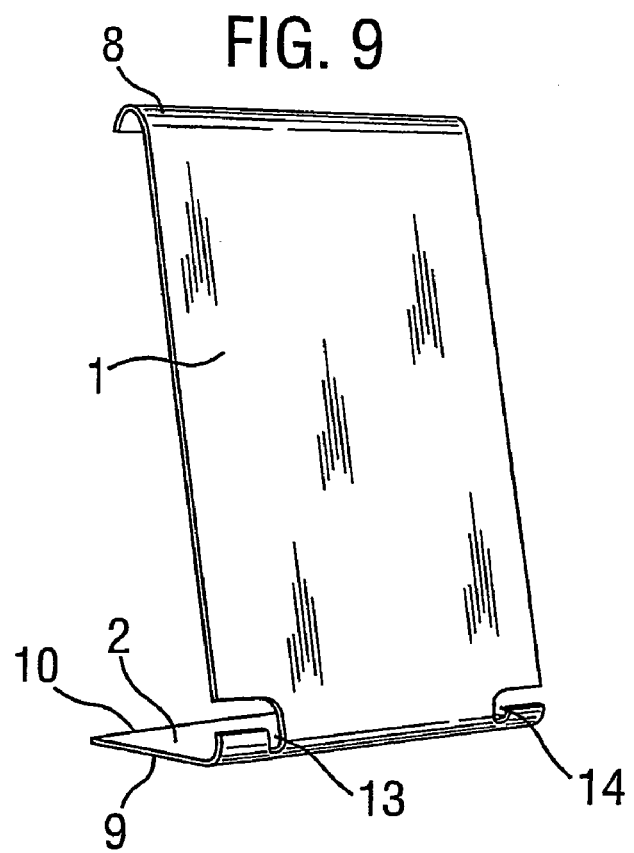
FIG. 9 is a front perspective view of a third embodiment of the invention.

FIG. 9 shows a third embodiment of the invention this time with a different style of guide, in which slots 13 and 14 extend inwards from the outer edges of the rigid member and then (when the device is in an upright position) extend downwards in order to hold the cable more tightly. As will be clear from the drawing, the length of vertical extension of slots 13 and 14 can be varied depending on the degree of cable retention required. The lengths of the slots may be the same providing a more aesthetically pleasing symmetry, or may be different, allowing the user to choose the degree of cable retention. This style of guide is particularly useful if the cable tidy is used in different orientations.

Figure 10:
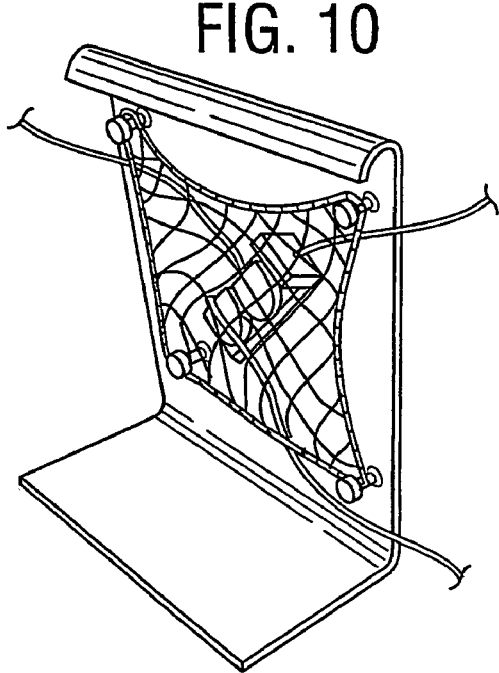
FIG. 10 is a rear perspective view of a fourth embodiment of the invention in use.
Figure 11:
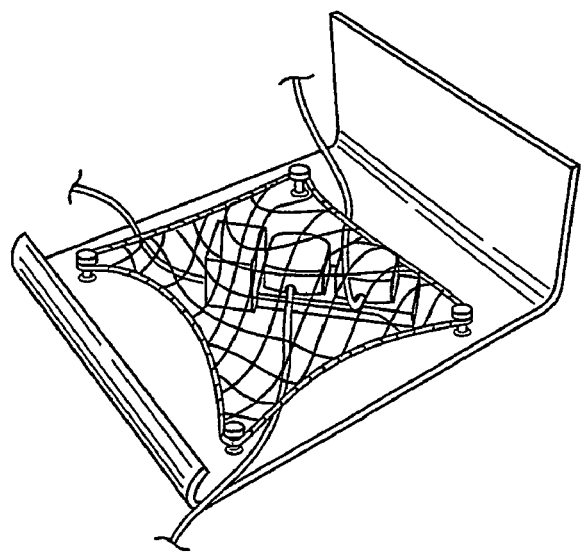
FIG. 11 is a perspective view of the fourth embodiment of the invention positioned to facilitate removal of wires.
Figure 12:
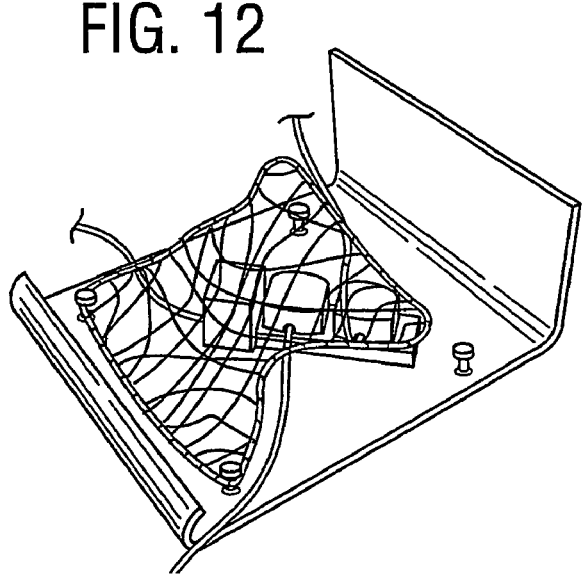
FIG. 12 is a perspective view of the fourth embodiment of the invention illustrating removal of the flexible member.
Figure 13:
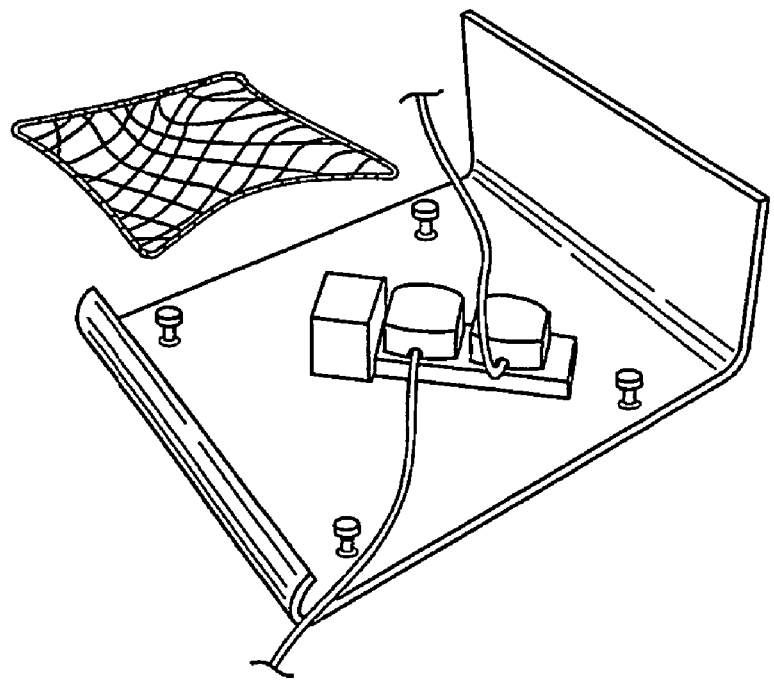
FIG. 13 is a perspective view of the fourth embodiment of the invention with the flexible member removed.
Figure 14:
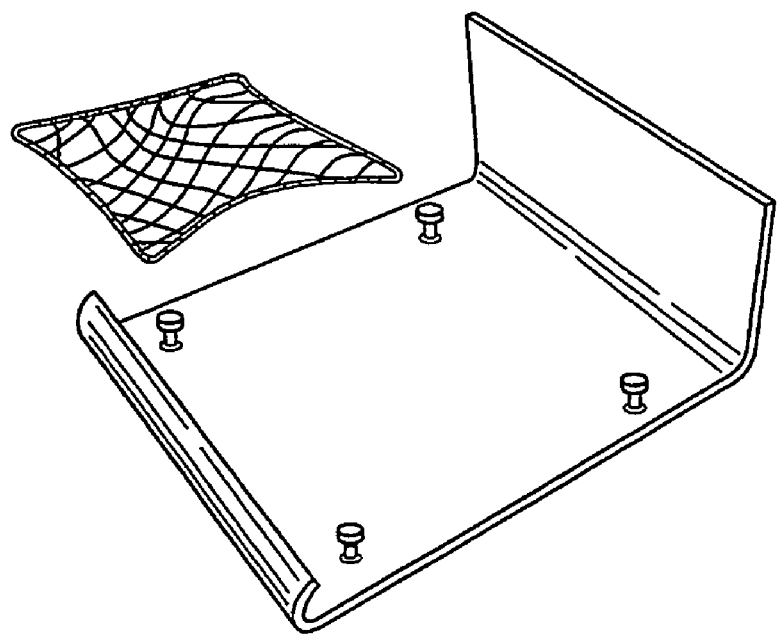
FIG. 14 is a perspective view of the fourth embodiment of the invention with the wires removed.

FIG. 10 shows a fourth embodiment wherein there is one continuous elasticated strap or surround around the flexible member. The strap is connected removably to the rigid member by studs with enlarged heads or the like, acting as hooks, thus forming openings allowing the cables to be introduced between the flexible and rigid members as illustrated in FIGS. 10 and 11, and enabling the flexible member to be easily removed to access the cables or multi-way connectors as illustrated in FIGS. 12-14.

In alternative arrangements, the flexible member and/or the strap may not be resilient but may be made from other materials as in the first embodiment in further alternative arrangements, at least part of the flexible member or the strap is not removable, but remains attached while other parts are removed for access to the cables. In further alternative arrangements, there is more than one strap as in the first embodiment.

The invention claimed is:

1. A receptacle for an associated electrical cable comprising a substantially rigid stand member carrying a flexible cable retaining member which is so formed as to resiliently retain the associated cable between the cable retaining member and the stand, wherein the cable retaining member is perforated such that more than half of a surface area of the cable retaining member comprises apertures to allow for a flow of air past the associated cable.

2. A receptacle according to claim 1, wherein the flexible member is connected to the rigid member by at least one strap.

3. A receptacle according to claim 2, wherein said at least one strap is resilient.

4. A receptacle according to claim 2, wherein said at least one strap is elasticated.

5. A receptacle according to claim 2 wherein at least part of said at least one strap connects the flexible member to the rigid member removably.

6. A receptacle according to claim 5 wherein said at least one strap connects the flexible member to the rigid member removably via studs with enlarged heads acting as hooks.

7. A receptacle according to claim 1, wherein said flexible member is resilient.

8. A receptacle according to claim 1, wherein the flexible member is connected to the rigid member by only one strap, the one strap forming a border around the periphery of the flexible member.

9. A receptacle according to claim 1, wherein the flexible member is a perforated bag.

10. A receptacle according to claim 1, wherein the flexible member is a net.

11. A receptacle according to claim 10, wherein the net is sufficiently elastic to permit an associated electrical plug appliance to be pushed through an aperture of the net and then retained securely inside it.

12. A receptacle according to claim 1, wherein the flexible member is elasticated.

13. A receptacle according to claim 1 in which the rigid member comprises a sheet of material, one edge of which is formed into an L-shaped cross-section, so as to form a stand.

14. A receptacle according to claim 1, wherein the rigid member includes cable guide means.

15. A receptacle according to claim 14, wherein said guide means comprises slots for locating the associated cable.

16. A receptacle according to claim 15, wherein the rigid member is formed from a sheet material and said each slot for locating cables extends inwards from an edge of the rigid member.

17. A receptacle according to claim 15, wherein said slots for locating the associated cable are so shaped as to co-operate with an adjacent surface in order to retain the associated cable.

18. A receptacle according to claim 14, wherein said guide means includes a trough formed at the opposite edge to the edge having the L-shaped cross-section.

19. A receptacle according to claim 1, wherein said rigid member has silicone or rubber strips to grip the surface of a table, a desk, or a shelf.

* * * * *